(12) United States Patent
Yang et al.

(10) Patent No.: US 11,569,873 B1
(45) Date of Patent: Jan. 31, 2023

(54) MIMO SIGNAL SYMBOL DETECTION AND SEARCH METHOD, DECODING CIRCUIT AND RECEIVING ANTENNA SYSTEM

(71) Applicant: INDUSTRIAL TECHNOLOGY RESEARCH INSTITUTE, Hsinchu (TW)

(72) Inventors: Kai-Jiun Yang, Zhubei (TW); Chi-Tien Sun, Hsinchu (TW); Shang-Ho Tsai, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/561,513

(22) Filed: Dec. 23, 2021

(51) Int. Cl.
  *H04B 7/04* (2017.01)
  *H04B 7/0413* (2017.01)
  *H04L 25/02* (2006.01)

(52) U.S. Cl.
  CPC ....... *H04B 7/0413* (2013.01); *H04L 25/0202* (2013.01)

(58) Field of Classification Search
  CPC ........... H04L 25/03242; H04L 25/0321; H04L 1/0054; H04L 25/02; H04L 25/0202; H04B 7/0413
  See application file for complete search history.

(56) References Cited

U.S. PATENT DOCUMENTS

| 9,124,459 | B2 | 9/2015 | Paker et al. |
| 10,084,526 | B2 | 9/2018 | Wu |
| 10,116,417 | B1 * | 10/2018 | Arvinte ................. H04L 1/0045 |
| 10,181,967 | B2 | 1/2019 | Rahmati et al. |
| 10,707,932 | B2 | 7/2020 | Dong |
| 10,873,373 | B2 | 12/2020 | Suh et al. |

(Continued)

FOREIGN PATENT DOCUMENTS

| CN | 101247207 A | 8/2008 |
| JP | 5121753-82 | 1/2013 |

(Continued)

OTHER PUBLICATIONS

Bao et al., "Low-complexity de-mapping algorithms for 64-APSK signals", ETRI Journal, vol. 41, No. 3, 2019, pp. 308-315.

(Continued)

*Primary Examiner* — Rahel Guarino
(74) *Attorney, Agent, or Firm* — Birch, Stewart, Kolasch & Birch, LLP

(57) ABSTRACT

A MIMO symbol detection and search method, a decoding circuit and a receiving antenna system are provided. The signal detection and search method includes the following steps. A symbol search tree is obtained, and a plurality of candidate symbols at each layer of the symbol search tree are sorted. The candidate symbols are traversed in sequence at each layer of the symbol search tree. At each layer of the symbol search tree, if a cumulative partial Euclidean distance is greater than or equal to a threshold, un-scanned candidate symbols are excluded. If the cumulative partial Euclidean distance is less than the threshold, the threshold is updated by the cumulative partial Euclidean distance. When all of the candidate symbols have been calculated, an estimated symbol combination is outputted, and the scan of the symbol search tree is terminated.

21 Claims, 14 Drawing Sheets

(56) References Cited

U.S. PATENT DOCUMENTS

| | | |
|---|---|---|
| 2008/0181339 A1 | 7/2008 | Chen et al. |
| 2010/0296554 A1 | 11/2010 | Uln et al. |
| 2012/0269303 A1 | 10/2012 | Paker et al. |
| 2017/0033895 A1 | 2/2017 | Jalloul |
| 2020/0028551 A1 | 1/2020 | Gudovskiy et al. |
| 2020/0313752 A1 | 10/2020 | Mao et al. |
| 2021/0184752 A1 | 6/2021 | Liao et al. |

FOREIGN PATENT DOCUMENTS

| | | |
|---|---|---|
| TW | 201044798 A1 | 12/2010 |
| WO | WO 2015/047428 A1 | 4/2015 |

OTHER PUBLICATIONS

Choi et al., "Novel MIMO Detection With Improved Complexity for Near-ML Detection in MIMO-OFDM Systems", IEEE Access, vol. 7, 2019, pp. 60389-60398.

Li et al., "Low-Complexity ML Detection for Spatial Modulation MIMO With APSK Constellation", IEEE Transactions On Vehicular Technology, vol. 64, No. 9, Sep. 2015, pp. 4315-4321.

Sandell et al., "Efficient Demodulation of General APSK Constellations", IEEE Signal Processing Letters, vol. 23, No. 6, Jun. 2016, pp. 868-872.

Studer et al., "Soft-Output Sphere Decoding: Algorithms and VLSI Implementation", IEEE Journal On Selected Areas in Communications, vol. 26, No. 2, Feb. 2008, pp. 290-300.

Wei et al., "Differential 16-QAM and 16-APSK for Uplink Massive MIMO Systems", IEEE Wireless Communications Letters, vol. 7, No. 2, Apr. 2018, pp. 170-173.

Yang et al., "Maximum Likelihood and Soft Input Soft Output MIMO Detection at a Reduced Complexity", IEEE Transactions On Vehicular Technology, vol. 67, No. 12, Dec. 2018, pp. 12389-12393.

Zhang et al., "Near ML soft bit estimation for APSK with very low complexity", IEEE 83rd Vehicular Technology Conference (VTC Spring), 2016, 5 pages.

Taiwanese Office Action and Search Report for Taiwanese Application No. 110148451, dated Jun. 23, 2022.

\* cited by examiner

MIMO SIGNAL SYMBOL DETECTION AND SEARCH METHOD, DECODING CIRCUIT AND RECEIVING ANTENNA SYSTEM

TECHNICAL FIELD

The disclosure relates in general to a Multi-input Multi-output (MIMO) signal symbol detection and search method, a decoding circuit and a receiving antenna system.

BACKGROUND

Multi-input Multi-output (MIMO) is a multi-antenna wireless communication system. The transmitting end sends signals via multiple transmitting antennas, and the receiving end receives and restores information via multiple receiving antennas.

Since MIMO could increase the amount of data transmission without increasing the transmission power or bandwidth, MIMO has been widely used in various communication devices.

At the receiving end of the MIMO, symbol detection and search must be performed to restore the original information. However, as the communication technology is moving towards more complex B5G (Beyond 5G) and other next-generation satellite broadband communication backbone architectures, the complexity of symbol detection and search grows exponentially with the modulation dimension, and symbol detection and search become quite time-consuming. Researchers are working on proposing a new symbol detection and search method to speed up the search and maintain the accuracy of the search.

SUMMARY

The disclosure is directed to a Multi-input Multi-output (MIMO) signal symbol detection and search method, a decoding circuit and a receiving antenna system.

According to one embodiment, a Multi-Input Multi-Output (MIMO) symbol detection and search method. The MIMO symbol detection and search method includes the following steps. A symbol search tree is obtained, and a plurality of candidate symbols are sorted at each layer of the symbol search tree. The candidate symbols are traversed in sequence at each layer of the symbol search tree. If a cumulative partial Euclidean distance is greater than or equal to a threshold, un-scanned candidate symbols at each layer of the symbol search tree are excluded. If the cumulative partial Euclidean distance is less than the threshold, the threshold is updated by the cumulative partial Euclidean distance. When all of the candidate symbols have been calculated, an estimated symbol combination is outputted, and the scan of the symbol search tree is terminated.

According to another embodiment, a decoding circuit is provided. The decoding circuit comprises a sorting unit, a controlling unit, a distance calculating unit and a threshold updating unit. The sorting unit is configured to sort a plurality of candidate symbols at each layer of a symbol search tree. The controlling unit is configured to traverse the candidate symbols in sequence at each layer of the symbol search tree. The distance calculating unit is configured to calculate a cumulative partial Euclidean distance. At each layer of the symbol search tree, if a cumulative partial Euclidean distance is greater than or equal to a threshold, the controlling unit excludes the un-scanned candidate symbols. If the cumulative partial Euclidean distance is less than the threshold, the threshold updating unit updates the threshold by the cumulative partial Euclidean distance. When all of the candidate symbols have been calculated, the controlling unit outputs an estimated symbol combination, and terminates the scan of the symbol search tree.

According to an alternative embodiment, a receiving antenna system is provided. The receiving antenna system comprises a receiving antenna, a RF combining circuit, a plurality of RF chains and a baseband combining circuit. The RF chains are connected to the RF combining circuit. The analog to digital circuits are respectively connected to the RF chains. The baseband combining circuit is connected to the analog to digital circuits. The baseband combining circuit includes a decoding circuit. The decoding circuit includes a sorting unit, a controlling unit, a distance calculating unit and a threshold updating unit. The sorting unit is configured to sort a plurality of candidate symbols at each layer of a symbol search tree. The controlling unit is configured to traverse the candidate symbols in sequence at each layer of the symbol search tree. The distance calculating unit is configured to calculate a cumulative partial Euclidean distance. At each layer of the symbol search tree, if a cumulative partial Euclidean distance is greater than or equal to a threshold, the controlling unit excludes the un-scanned candidate symbols. If the cumulative partial Euclidean distance is less than the threshold, the threshold updating unit updates the threshold by the cumulative partial Euclidean distance. When all of the candidate symbols have been calculated, the controlling unit outputs an estimated symbol combination, and terminates the scan of the symbol search tree.

Figure 1:
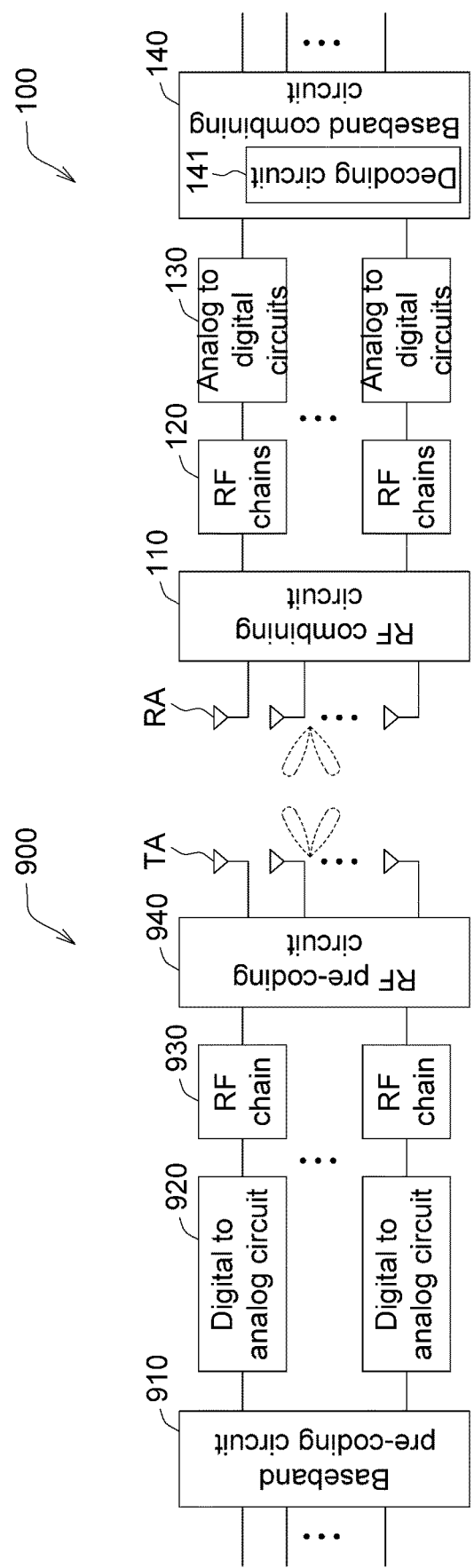
FIG. 1 shows a transmitting antenna system and a receiving antenna system according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a transmitting antenna system 900 and a receiving antenna system 100 according to an embodiment. The transmitting antenna system 900 includes a baseband pre-coding circuit 910, a plurality of digital to analog circuits 920, a plurality of RF chains 930, and a RF pre-coding circuit 940 and a plurality of transmitting antennas TA. The digital to analog circuits 920 are connected to the baseband pre-coding circuit 910. The RF chains 930 are respectively connected to the digital to analog circuits 920. The RF pre-coding circuit 940 is connected to the RF chains 930. The transmitting antennas TA are connected to the RF pre-coding circuit 940.

After the wireless signal is sent out via the transmitting antennas TA of the transmitting antenna system 900, it is transmitted to the receiving antenna system 100. The receiving antenna system 100 includes a plurality of receiving antennas RA, a RF combining circuit 110, a plurality of RF chains 120, a plurality of analog to digital circuits 130 and a baseband combining circuit 140. The RF combining circuit 110 is connected to the receiving antennas RA. The RF chains 120 are connected to the RF combining circuit 110. The analog to digital circuits 130 are respectively connected to the RF chains 120. The baseband combining circuit 140 is connected to the analog to digital circuits 130.

The baseband combining circuit 140 includes a decoding circuit 141. The decoding circuit 141 is used to analyze the transmission signal sent by the transmitting antenna system 900.

Figure 2:
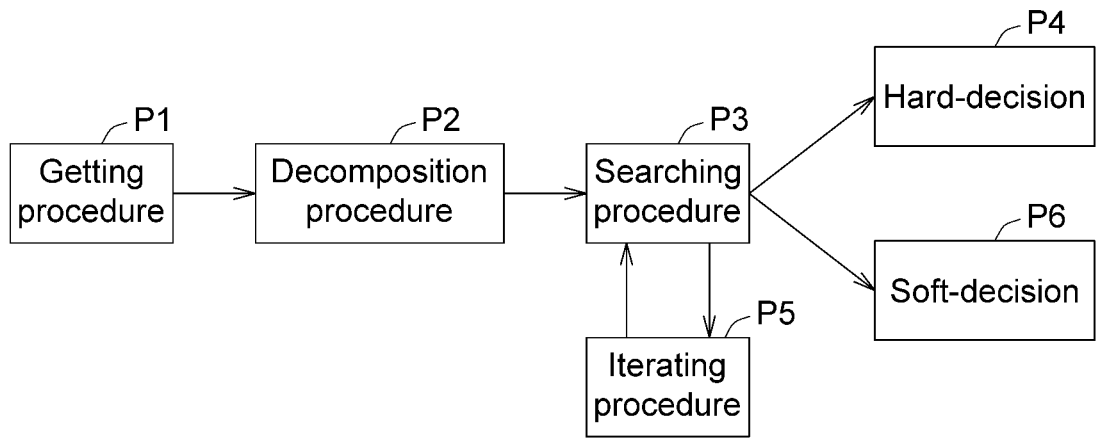
FIG. 2 shows a process of the symbol detection and search according to an embodiment.

Please refer to FIG. 2, which shows a process of the symbol detection and search according to an embodiment. First, in the getting procedure P1, the received signal is got and a channel is estimated.

Next, in the decomposition procedure P2, a QR decomposition is performed on the channel.

Then, in the searching procedure P3, a Maximum Likelihood (ML) algorithm is performed for symbol detection and search.

It could be applied to a hard-decision P4 or a soft-decision P6.

In the searching procedure P3, the iterating procedure P5 could be used to improve the accuracy of the soft-decision P6.

In this embodiment, a new search strategy is used to improve the search speed of the searching procedure P3 and the accuracy of the hard-decision P4 and the soft-decision P6 is lossless.

The symbol detection and search method proposed in this embodiment is applicable to the encoding of the Amplitude and Phase-Shift Keying modulation (APSK modulation), and also applicable to the encoding of the Quadrature Amplitude Modulation (QAM).

Figure 3A:
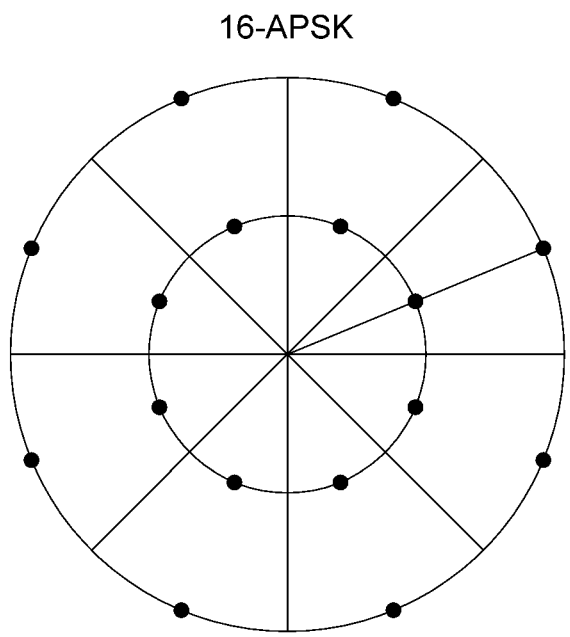
FIG. 3A shows a schematic diagram of 16-APSK encoding according to an embodiment.
Figure 3B:
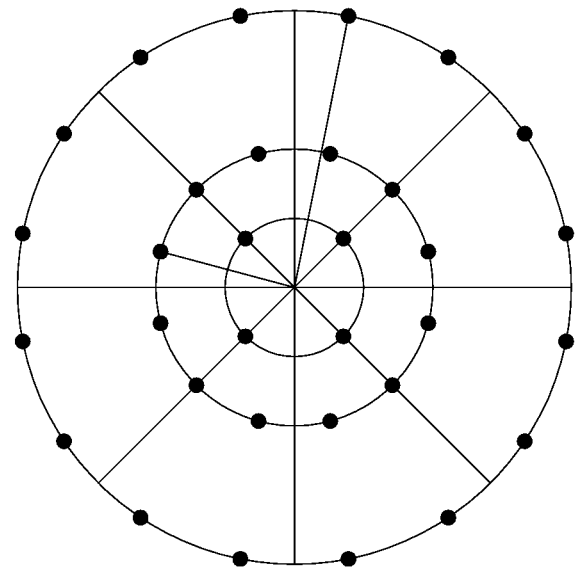
FIG. 3B shows a schematic diagram of 32-APSK encoding according to an embodiment.
Figure 3C:
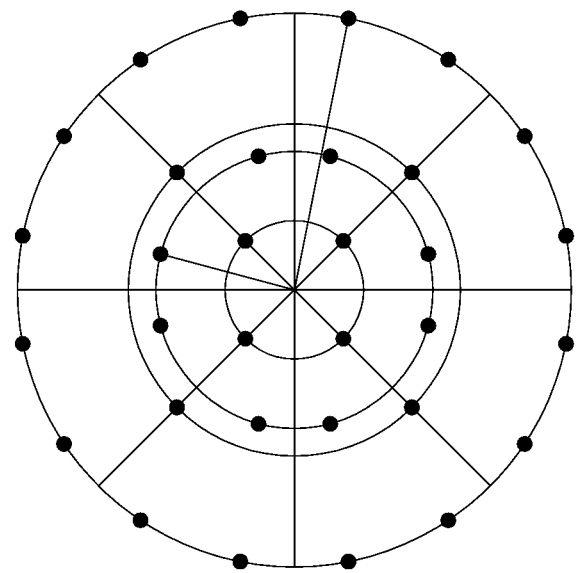
FIG. 3C shows a schematic diagram of 32-APSK encoding with unequal symbol radius according to an embodiment.

Please refer to FIGS. 3A to 3C. FIG. 3A shows a schematic diagram of 16-APSK encoding according to an embodiment. FIG. 3B shows a schematic diagram of 32-APSK encoding according to an embodiment.

FIG. 3C shows a schematic diagram of 32-APSK encoding with unequal symbol radius according to an embodiment. The APSK modulation has been widely adopted in the next-generation satellite broadband communication backbone architectures, such as B5G (Beyond 5G). Each point on the FIGS. 3A to 3C is the candidate symbol to be searched. As shown in FIG. 3A to 3C, the modulation dimension of APSK modulation grows geometrically and the signal radius is not fixed, so the search complexity becomes quite high.

Taking $M_T$ transmitting antennas TA and $M_R$ receiving antennas RA as an example, the relationship between the receiving signal and the transmitting signal is as the following equation (1). H is the channel response, s is the transmitted signal vector, y is the received data vector, and n is the noise vector.

$$Y = Hs + n \qquad (1)$$

In the above searching procedure P3, it is mainly required to obtain the ŝ in the following equation (2).

$$\hat{s} = \underset{s \in \Lambda^{M_T}}{\arg\min} \|y - Hs\|^2 \qquad (2)$$

After H is decomposed by the QR decomposition of the following equation (3), ŷ in the following equation (4) could be obtained. R is the upper triangular matrix.

$$H = [Q_1 Q_2] \begin{bmatrix} R \\ 0 \end{bmatrix} \qquad (3)$$

$$\hat{y} = Q_1^H y \qquad (4)$$

ŝ in equation (2) could be replaced by the following equation (5).

$$\hat{s} = \underset{s \in \Lambda^{M_T}}{\arg\min} \|y - Rs\|^2 \qquad (5)$$

Taking four transmitting antennas TA and four receiving antennas RA as an example, each of the receiving antennas RA corresponds to four candidate symbols SS0, SS1, SS2, SS3. $\|\hat{y} - Rs\|^2$ is, for example, the following equation (6).

$$\|\hat{y} - Rs\|^2 = \begin{Vmatrix} \hat{y_0} - (R_{00}s_0 + R_{01}s_1 + R_{02}s_2 + R_{03}s_3) \\ \hat{y_1} - (R_{11}s_1 + R_{12}s_2 + R_{13}s_3) \\ \hat{y_2} - (R_{22}s_2 + R_{23}s_3) \\ \hat{y_3} - (R_{33}s_3) \end{Vmatrix} \qquad (6)$$

Figure 4:
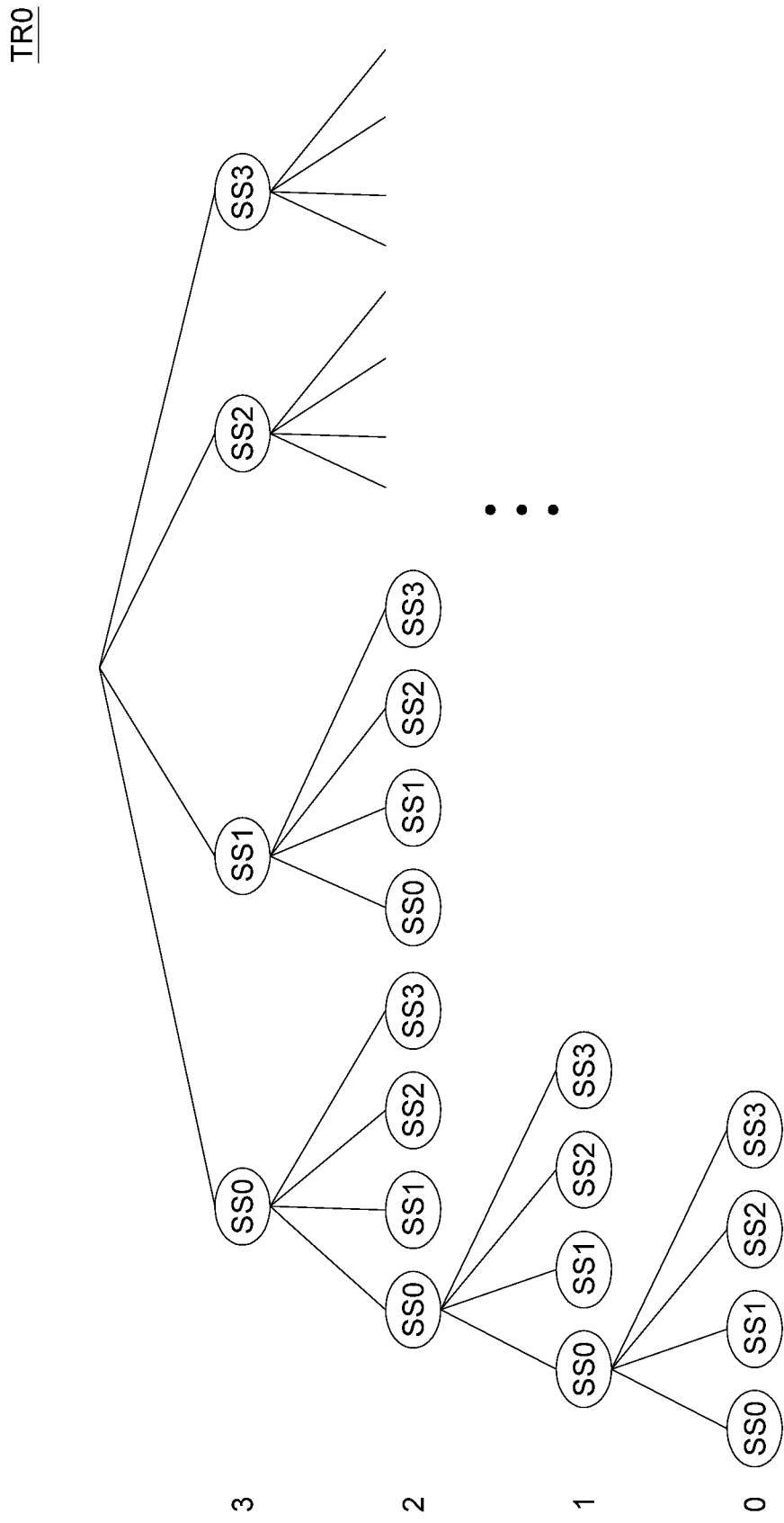
FIG. 4 shows a symbol search tree.

Please refer to FIG. 4 which shows a symbol search tree TR0. Taking four transmitting antennas TA and four receiving antennas RA as an example, the symbol search tree TR0 has layer 0 to layer 3. The layer 3 represents the four candidate symbols SS0, SS1, SS2, SS3 of $s_3$. The layer 2 represents the four candidate symbols SS0, SS1, SS2, SS3 of $s_2$. The layer 1 represents the four candidate symbols SS0, SS1, SS2, SS3 of $s_1$. The layer 0 represents the four candidate symbols SS0, SS1, SS2, SS3 of $s_0$. Any path from the layer 3 to the layer 0 constitutes a set of solutions of $s_3$, $s_2$, $s_1$, $s_0$.

However, if the symbol detection and search are performed in an exhaustive manner, a large amount of computing resources will be consumed and the computing speed will be delayed.

Figure 5:
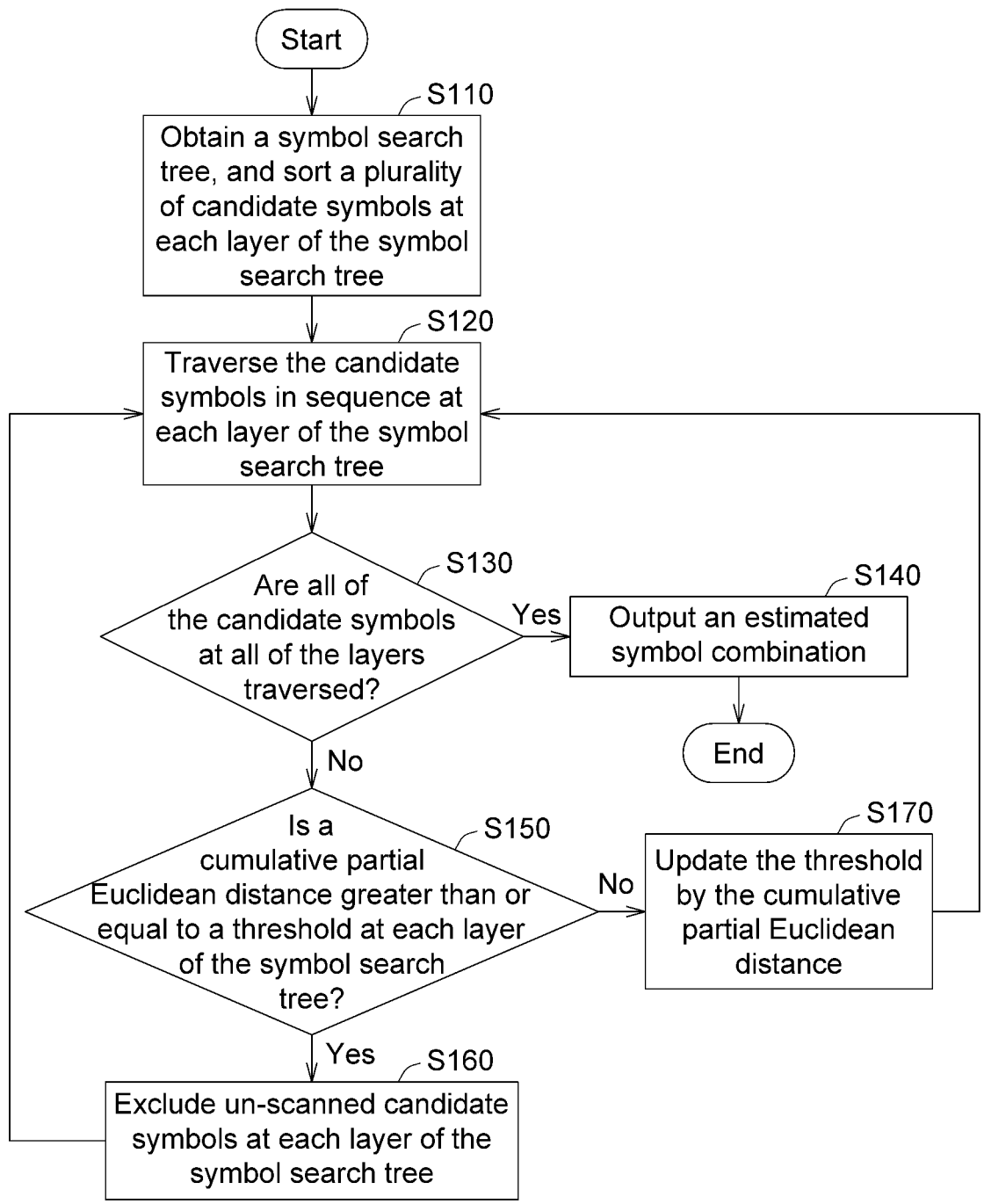
FIG. 5 shows a flowchart of the MIMO symbol detection and search method according to an embodiment.

Please refer to FIG. 5, which shows a flowchart of the MIMO symbol detection and search method according to an embodiment. For the convenience of explanation, an example is illustrated via four transmitting antennas TA and four receiving antennas RA. However, the technique of this embodiment is applicable to N transmitting antennas TA and M receiving antennas RA, and N and M are any positive integers greater than or equal to 2. First, in step S110, the symbol search tree TR1 is obtained and the candidate symbols SS0 to SS3 are sorted at each layer of the symbol search tree TR0. Please refer to FIG. 6, which shows the symbol search tree TR1 sorted according to an embodiment. The order of candidate symbols SS0 to SS3 at each layer is not exactly the same.

Figure 6:
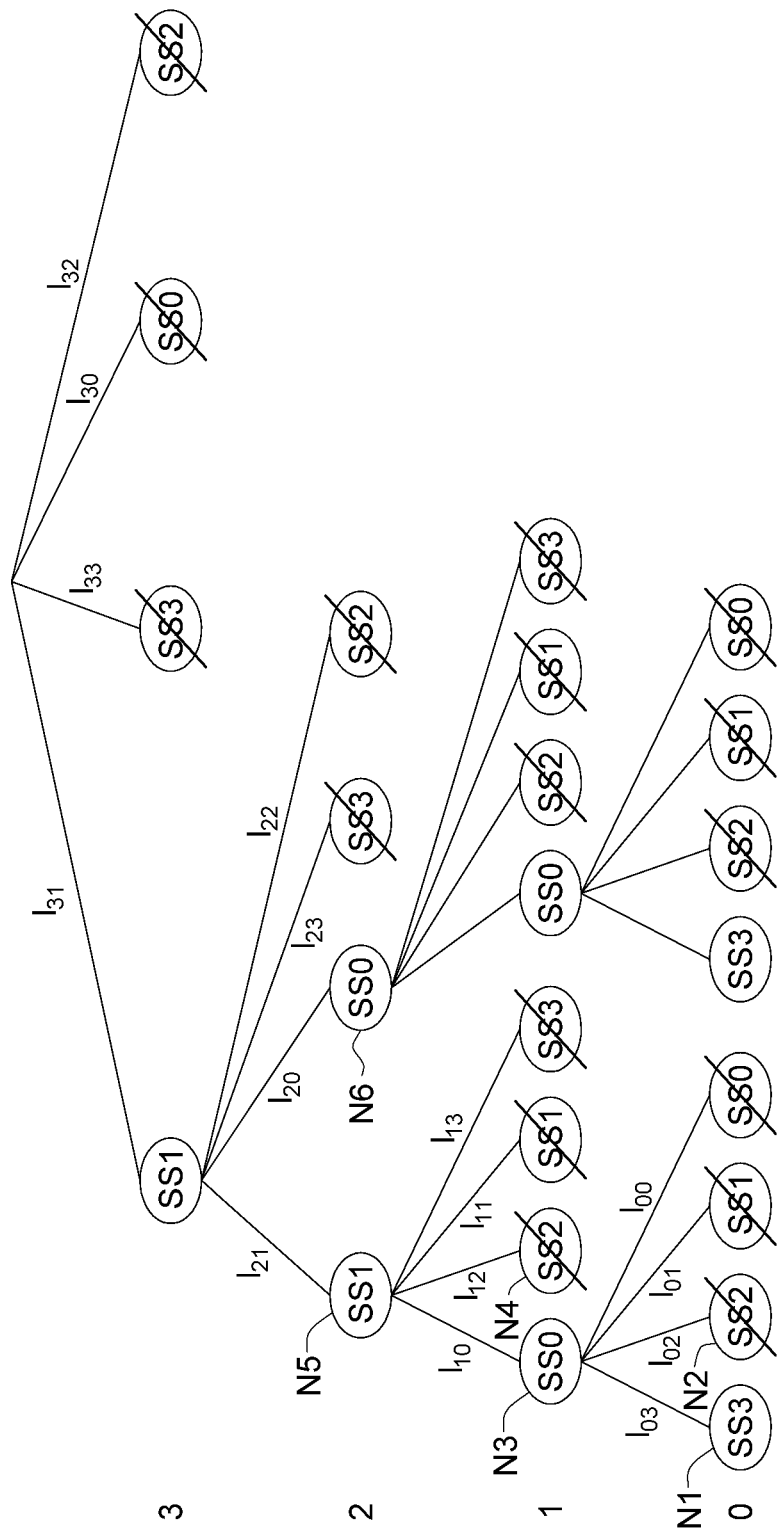
FIG. 6 shows the symbol search tree sorted according to an embodiment.
Figure 7A:
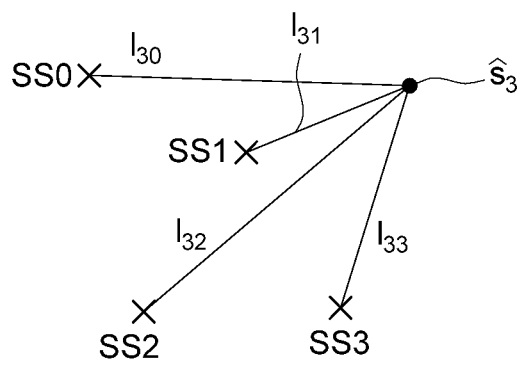
FIG. 7A shows the relationship between the candidate symbols and an estimation symbol.

Please refer to FIG. 7A, which shows the relationship between the candidate symbols SS0 to SS3 and the estimation symbol $\hat{s}_3$. As shown in FIG. 7A, there are several geometric distances $l_{30}$ to $l_{33}$ between the candidate symbols SS0 to SS3 and the estimation symbol $\hat{s}_3$. As shown in the layer 3 of FIG. 6, the candidate symbols SS1, SS3, SS0, SS2 are sorted according to geometric distances $l_{31}$, $l_{33}$, $l_{30}$, $l_{32}$ from low to high.

Figure 7B:
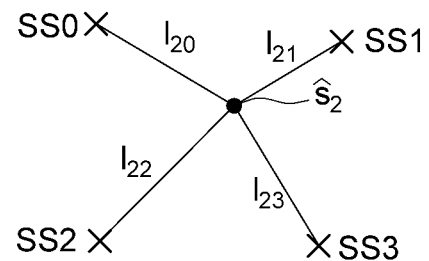
FIG. 7B shows the relationship between the candidate symbols and another estimation symbol.

Please refer to FIG. 7B, which shows the relationship between the candidate symbols SS0 to SS3 and the estimation symbol $\hat{s}_2$. As shown in FIG. 7B, there are several geometric distances $l_{20}$ to $l_{23}$ between the candidate symbols SS0 to SS3 and the estimation symbol $\hat{s}_2$. As shown in the layer 2 of FIG. 6, the candidate symbols SS1, SS0, SS3, and SS2 are sorted according to the geometric distances $l_{21}$, $l_{20}$, $l_{23}$, $l_{22}$ from low to high.

Figure 7C:
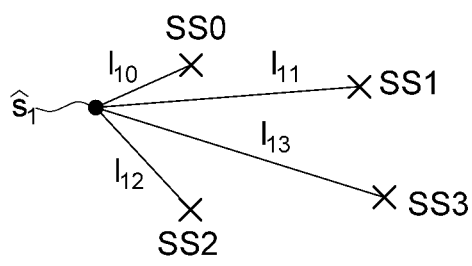
FIG. 7C shows the relationship between the candidate symbols and another estimation symbol.

Please refer to FIG. 7C, which shows the relationship between the candidate symbols SS0 to SS3 and the estimation symbol $\hat{s}_1$. As shown in FIG. 7C, there are several geometric distances $l_{10}$ to $l_{13}$ between the candidate symbols SS0 to SS3 and the estimation symbol $\hat{s}_1$. As shown in the layer 1 of FIG. 6, the candidate symbols SS0, SS2, SS1, SS3 are sorted according to the geometric distances $l_{10}$, $l_{12}$, $l_{11}$, $l_{13}$ from low to high.

Figure 7D:
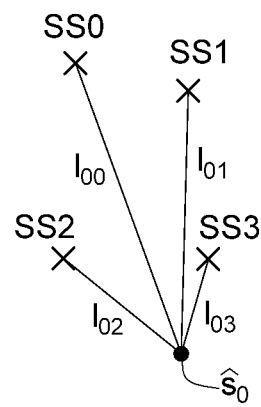
FIG. 7D shows the relationship between the candidate symbols and another estimation symbol.

Please refer to FIG. 7D, which shows the relationship between the candidate symbols SS0 to SS3 and the estimation symbol $\hat{s}_0$. As shown in FIG. 7D, there are several geometric distances $l_{00}$ to $l_{03}$ between the candidate symbols SS0 to SS3 and the estimation symbol $\hat{s}_0$. As shown in the layer 0 of FIG. 6, the candidate symbols SS3, SS2, SS1, SS0 are sorted according to the geometric distances $l_{03}$, $l_{02}$, $l_{01}$, $l_{00}$ from low to high.

After sorting in the above manner, the symbol search tree TR1 as shown in FIG. 6 could be obtained. From the layer 3 to the layer 0 of the symbol search tree TR1, the leftmost path of the symbol search tree TR1 forms an initial solution.

Next, in step S120, in each layer of the symbol search tree TR1, the candidate symbols SS0 to SS3 are traversed in sequence. For example, in this embodiment, the candidate symbols SS0 to SS3 are searched via a Depth-First-Search (DFS) algorithm. After obtaining the initial solution (i.e. the leftmost path of the symbol search tree TR1), the bottom layer (i.e. the layer 0) is searched first. When searching at the layer 0, the searching is performed in the order of the candidate symbols SS3, SS2, SS1, SS0. When searching at the layer 1, the searching is performed in the order of the candidate symbols SS0, SS2, SS1, SS3. When searching at the layer 2, the searching is performed in the order of the candidate symbols SS1, SS0, SS3, SS2. When searching at the layer 3, the searching is performed in the order of the candidate symbols SS1, SS3, SS0, SS2.

In step S130, whether all of the candidate symbols SS0, SS2, SS1, SS3 at all of the layers are traversed is determined. If all of the candidate symbols SS0, SS2, SS1, SS3 at all of the layers are traversed, the process proceeds to step S140; if not all of the candidate symbols SS0, SS2, SS1, SS3 at all of the layers are traversed, the process proceeds to step S150.

In the step S140, an estimated symbol combination is outputted, and the scan of the symbol search tree TR1 is terminated.

In step S150, during the scanning at each layer of the symbol search tree TR1, whether the cumulative partial Euclidean distance PED is greater than or equal to a threshold SC is determined. If the cumulative partial Euclidean distance PED is greater than or equal to the threshold SC, the process proceeds to step S160; if the cumulative partial Euclidean distance PED is less than the threshold SC, the process proceeds to step S170.

The initial value of the threshold SC is infinite. After the initial solution is obtained, the threshold SC is updated to the cumulative partial Euclidean distance PED of the initial solution. Taking FIG. 6 as an example, the cumulative partial Euclidean distance PED of the initial solution is the combination of the geometric distances $l_{31}$, $l_{21}$, $l_{10}$, $l_{03}$.

In step S160, when scanning at each layer of the symbol search tree TR1, some of the candidate symbols SS0 to SS3 that unscanned are excluded.

In step S170, the threshold SC is updated by the cumulative partial Euclidean distance PED.

Taking FIG. 6 as an example, the node N1 is the initial solution. The current threshold SC is the cumulative partial Euclidean distance PED of the node N1. After searching for node N1, it could be found that the cumulative partial Euclidean distance PED of the node N2 is greater than the threshold SC, so the candidate symbols SS2, SS1, SS0 in the sibling nodes that have not been scanned are excluded.

After the node N3 is searched, it could be found that the cumulative partial Euclidean distance PED of the node N4 is greater than the threshold SC, so the candidate symbols SS2, SS1, SS3 in the sibling nodes that have not been scanned are excluded.

After searching for the node N5, it could be found that the cumulative partial Euclidean distance PED of the node N6 is less than the threshold SC, so the threshold SC is updated by the cumulative partial Euclidean distance PED of the node N6, and the search is continued.

According to the above method, in the search process, many candidate symbols in the sibling nodes that have not been scanned are excluded, so a lot of computing resources could be saved, and the search speed could be greatly increased. In addition, the cumulative partial Euclidean distance PED of the excluded candidate symbols will not be lower than the threshold SC, so the best solution will not be excluded, and the search accuracy is lossless.

Figure 8:
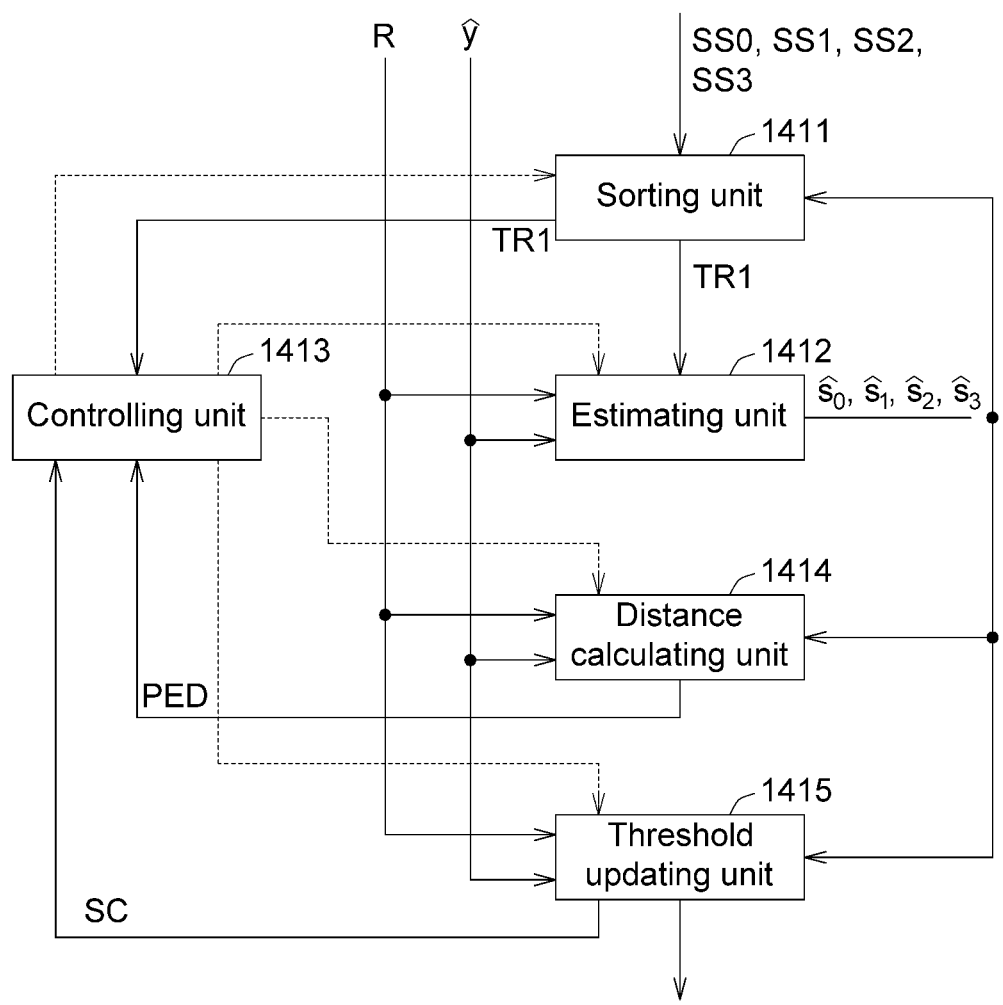
FIG. 8 shows a block diagram of a decoding circuit according to an embodiment.
Figure 9A:
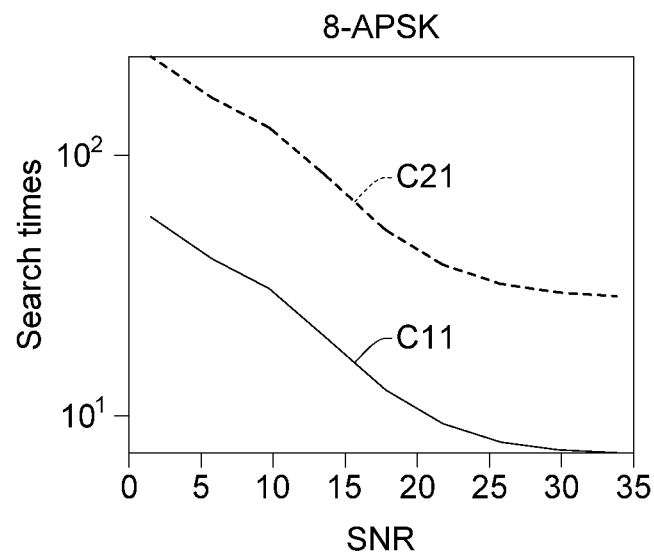
FIGS. 9A to 9F show search times comparison charts between the present embodiment and the Maximum Likelihood (ML) algorithm applying to the symbol detection and search for four transmitting antennas and four receiving antennas.
Figure 9B:
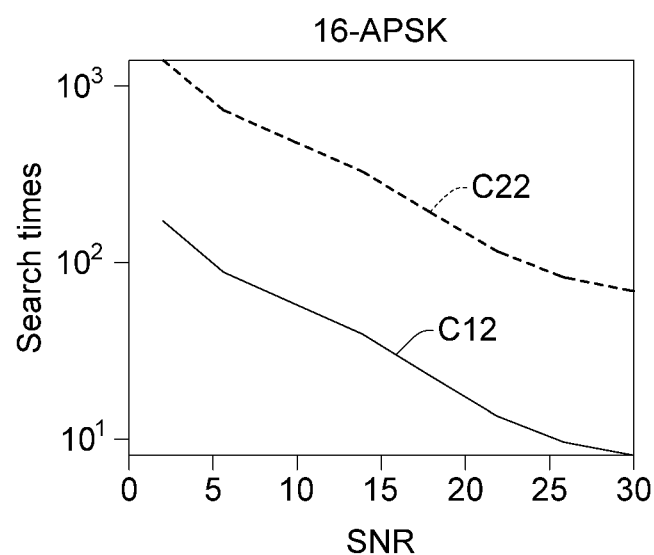
Figure 9C:
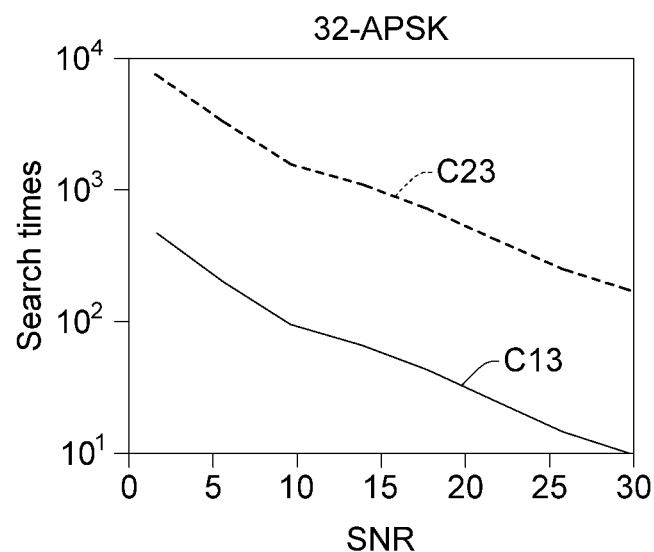
Figure 9D:
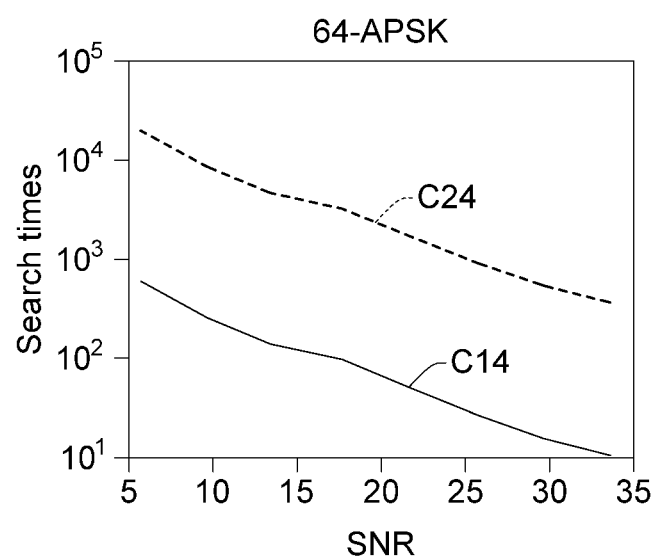
Figure 9E:
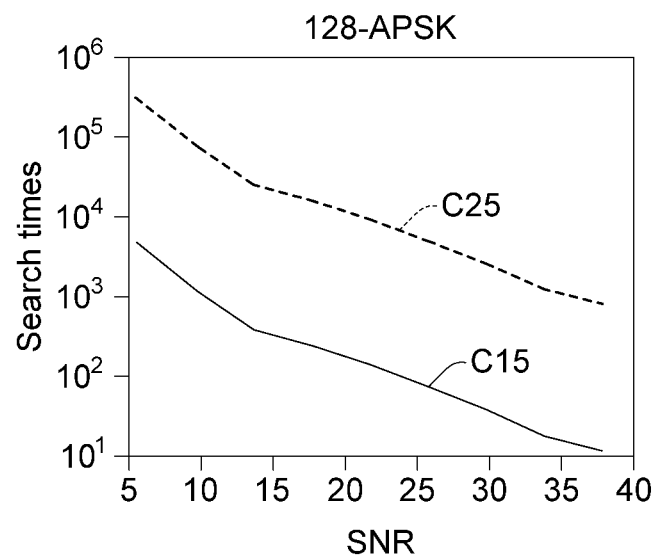
Figure 9F:
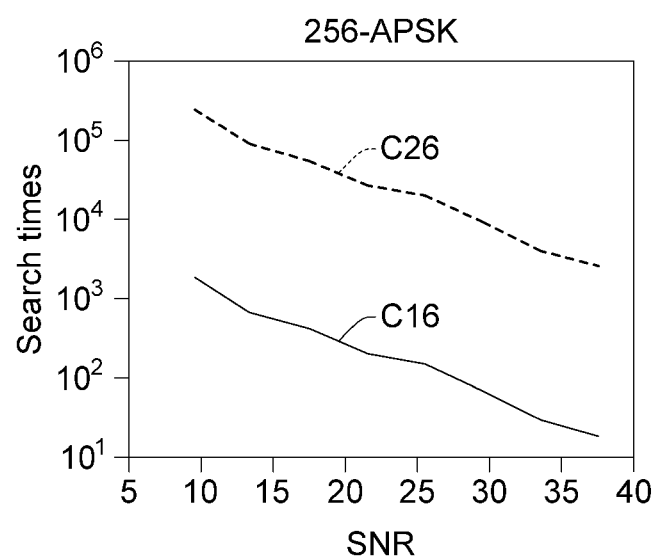
Figure 10A:
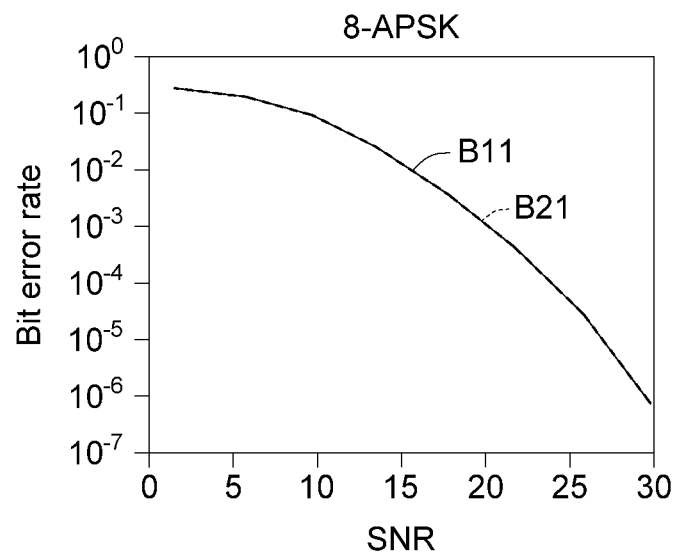
FIGS. 10A to 10F show bit error rate comparison charts between the present embodiment and the ML algorithm applying to the symbol detection and search for four transmitting antennas and four receiving antennas.
Figure 10B:
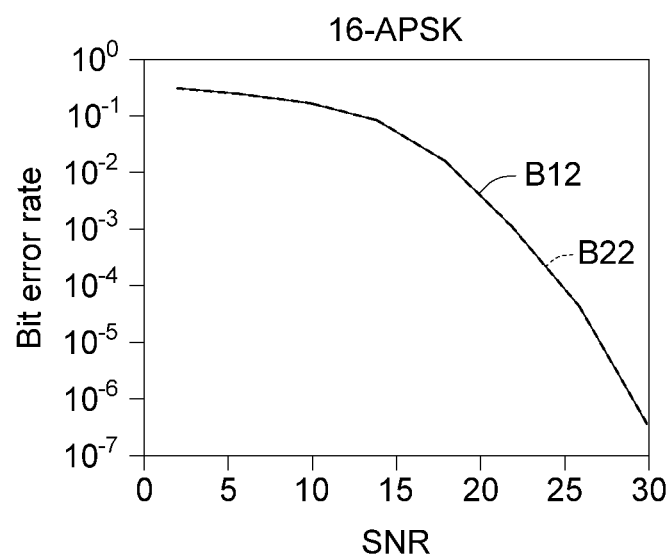
Figure 10C:
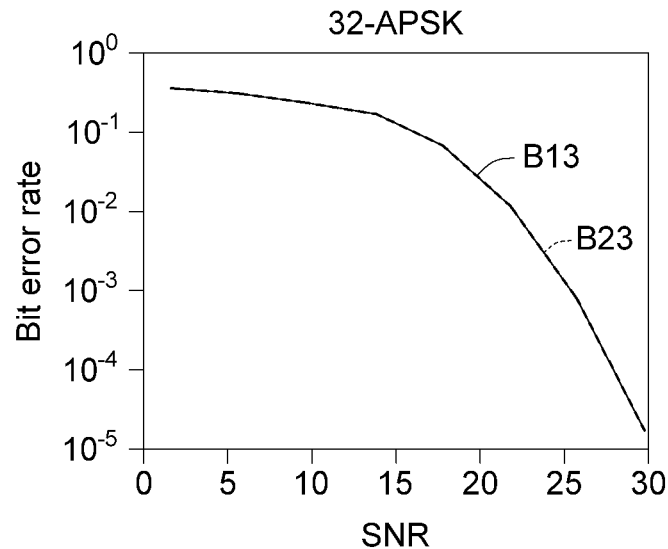
Figure 10D:
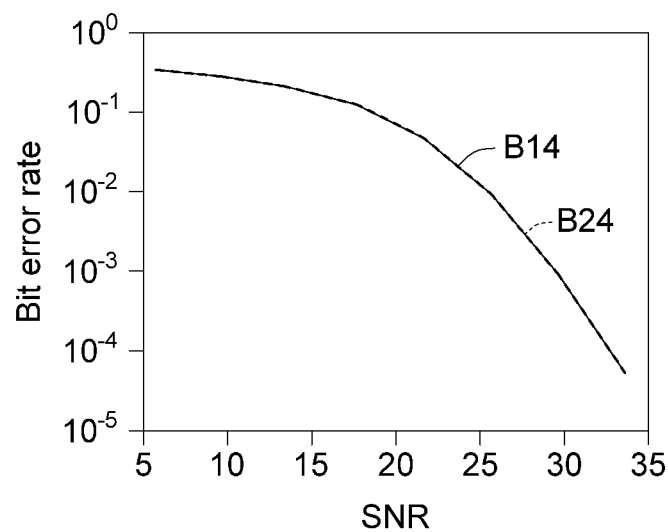
Figure 10E:
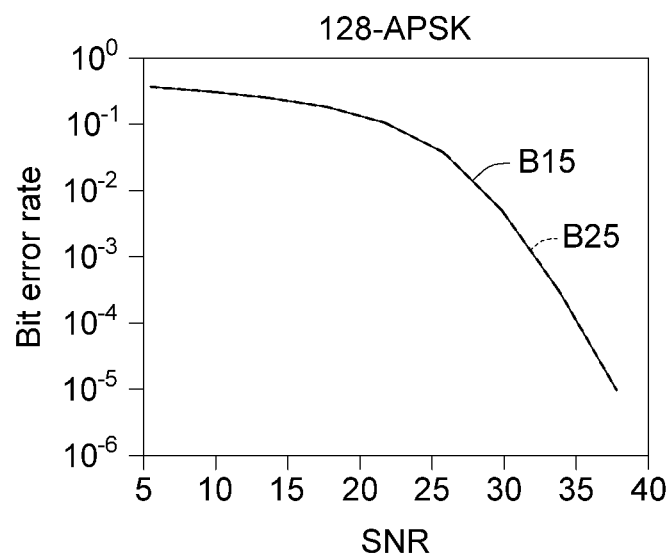
Figure 10F:
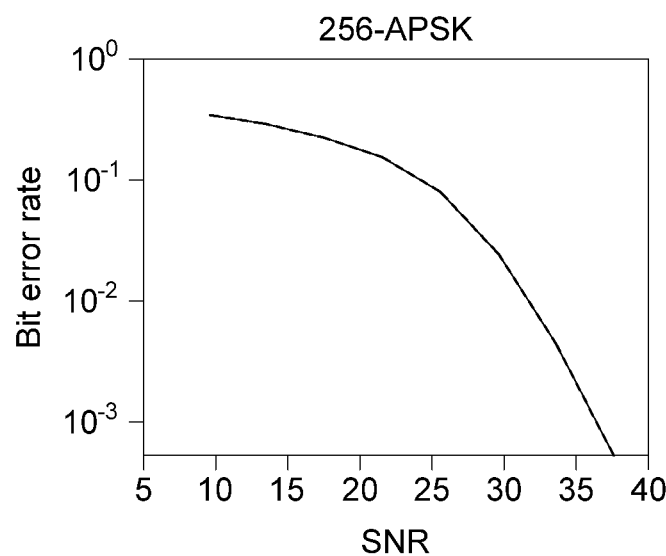

Please refer to FIG. 8, which shows a block diagram of the decoding circuit 141 according to an embodiment. The decoding circuit 141 includes a sorting unit 1411, an estimating unit 1412, a controlling unit 1413, a distance calculating unit 1414 and a threshold updating unit 1415.

The sorting unit 1411 is used to sort the candidate symbols SS0 to SS3 at each layer of the symbol search tree TR1. The estimating unit 1412 is used to estimate each of the estimation symbols $\hat{s}_0$, $\hat{s}_1$, $\hat{s}_2$, $\hat{s}_3$ based on a received signal. As mentioned above, the sorting unit 1411 sorts the candidate symbols SS1, SS3, SS0, SS2 according to the geometric distance $l_{31}$, $l_{33}$, $l_{30}$, $l_{32}$ of the candidate symbols SS0 to SS3 and the estimation symbol $\hat{s}_3$. The sorting unit 1411 sorts the candidate symbols SS1, SS0, SS3, SS2 according to the geometric distances $l_{21}$, $l_{20}$, $l_{23}$, $l_{22}$ of the candidate symbols SS0 to SS3 and the estimation symbol $\hat{s}_2$. The sorting unit 1411 sorts the candidate symbols SS0, SS2, SS1, SS3 according to the geometric distances $l_{10}$, $l_{12}$, $l_{11}$, $l_{13}$ of the candidate symbols SS0 to SS3 and the estimation symbol $\hat{s}_1$. The sorting unit 1411 sorts the candidate symbols SS3, SS2, SS1, SS0 according to the geometric distances $l_{03}$, $l_{02}$, $l_{01}$, $l_{00}$ of the candidate symbols SS0 to SS3 and the estimation symbol $\hat{s}_0$.

The controlling unit 1413 is used to traverse the candidate symbols SS0 to SS3 in sequence at each layer of the symbol search tree TR1.

The distance calculating unit 1414 is used to calculate the cumulative partial Euclidean distance. At each layer of the symbol search tree TR1, if the cumulative partial Euclidean distance PED is greater than or equal to the threshold SC, the controlling unit 1413 excludes the candidate symbols SS0 to SS3 in the sibling nodes that are un-scanned.

If the cumulative partial Euclidean distance PED is less than the threshold SC, the threshold updating unit 1415 updates the threshold SC by the cumulative partial Euclidean distance PED.

Please refer to FIGS. 9A to 9F, which show search times comparison charts between the present embodiment and the Maximum Likelihood (ML) algorithm applying to the symbol detection and search for four transmitting antennas TA and four receiving antennas RA. As shown in FIG. 9A to 9F, under 8-APSK to 256-APSK, the search times curves C11, C12, C13, C14, C15, C16 corresponding to the present embodiment are significantly lower than the search times curves C21, C22, C23, C24, C25, C26 corresponding to the ML algorithm. In other words, the symbol detection and search method of the present embodiment greatly accelerates the search speed.

Please refer to FIGS. 10A to 10F, which show bit error rate comparison charts between the present embodiment and the ML algorithm applying to the symbol detection and search for four transmitting antennas TA and 4 receiving antennas RA. As shown in FIGS. 10A to 10F, under 8-APSK to 256-APSK, the bit error rate curves B11, B12, B13, B14, B15, B16 corresponding to the present embodiment are equivalent to the bit error rate curves B21, B22, B23, B24, B25, B26 corresponding to the ML algorithm. In other words, the symbol detection and search method of this embodiment greatly accelerates the search speed.

According to the foregoing embodiments, during the searching process of the decoding circuit 141, many candidate symbols in the sibling nodes that have not been scanned are excluded, so a large amount of computing resources could be saved, and the search speed could be greatly accelerated. In addition, the cumulative partial Euclidean distance of the excluded candidate symbol will not be lower than the threshold, so the best solution will not be excluded, and the search accuracy is lossless.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A Multi-Input Multi-Output (MIMO) symbol detection and search method, comprising:
    obtaining a symbol search tree, and sorting a plurality of candidate symbols at each layer of the symbol search tree;
    traversing the candidate symbols in sequence at each layer of the symbol search tree;
    excluding un-scanned candidate symbols at each layer of the symbol search tree, if a cumulative partial Euclidean distance is greater than or equal to a threshold;
    updating the threshold by the cumulative partial Euclidean distance, if the cumulative partial Euclidean distance is less than the threshold; and
    outputting an estimated symbol combination, and terminating scan of the symbol search tree, when all of the candidate symbols have been calculated.

2. The MIMO symbol detection and search method according to claim 1, wherein the candidate symbols are sorted according to a plurality of geometric distances between the candidate symbols and an estimation symbol.

3. The MIMO symbol detection and search method according to claim 2, wherein the candidate symbols are sorted according to the geometric distances from low to high.

4. The MIMO symbol detection and search method according to claim 1, wherein the candidate symbols are defined via an Amplitude and Phase-Shift Keying modulation (APSK modulation).

5. The MIMO symbol detection and search method according to claim 1, wherein the candidate symbols are defined via a Quadrature Amplitude Modulation (QAM).

6. The MIMO symbol detection and search method according to claim 1, wherein the candidate symbols are searched via a Depth-First-Search (DFS) algorithm.

7. The MIMO symbol detection and search method according to claim 1, wherein a leftmost path of the symbol search tree forms an initial solution.

8. A decoding circuit, comprising:
    a sorting unit, configured to sort a plurality of candidate symbols at each layer of a symbol search tree;
    a controlling unit, configured to traverse the candidate symbols in sequence at each layer of the symbol search tree;
    a distance calculating unit, configured to calculate a cumulative partial Euclidean distance, wherein at each layer of the symbol search tree, if a cumulative partial Euclidean distance is greater than or equal to a threshold, the controlling unit excludes a plurality of un-scanned candidate symbols; and
    a threshold updating unit, wherein if the cumulative partial Euclidean distance is less than the threshold, the threshold updating unit updates the threshold by the cumulative partial Euclidean distance, and when all of the candidate symbols have been calculated, the controlling unit outputs an estimated symbol combination, and terminates scan of the symbol search tree.

9. The decoding circuit according to claim 8, further comprising:
    an estimating unit, configured to estimate an estimation symbol according to a receiving signal, wherein the sorting unit sorts the candidate symbols according to a plurality of geometric distances between the candidate symbols and an estimation symbol.

10. The decoding circuit according to claim 9, wherein the candidate symbols are sorted according to the geometric distances from low to high.

11. The decoding circuit according to claim 8, wherein the candidate symbols are defined via an Amplitude and Phase-Shift Keying modulation (APSK modulation).

12. The decoding circuit according to claim 8, wherein the candidate symbols are defined via a Quadrature Amplitude Modulation (QAM).

13. The decoding circuit according to claim 8, wherein the controlling unit searches the candidate symbols via a Depth-First-Search (DFS) algorithm.

14. The decoding circuit according to claim 8, wherein a leftmost path of the symbol search tree forms an initial solution.

15. A receiving antenna system, comprising:
a receiving antenna;
a RF combining circuit;
a plurality of RF chains, connected to the RF combining circuit;
a plurality of analog to digital circuits, respectively connected to the RF chains; and
a baseband combining circuit, connected to the analog to digital circuits, wherein the baseband combining circuit includes a decoding circuit, and the decoding circuit includes:
  a sorting unit, configured to sort a plurality of candidate symbols at each layer of a symbol search tree;
  a controlling unit, configured to traverse the candidate symbols in sequence at each layer of the symbol search tree;
  a distance calculating unit, configured to calculate a cumulative partial Euclidean distance, wherein at each layer of the symbol search tree, if a cumulative partial Euclidean distance is greater than or equal to a threshold, the controlling unit excludes a plurality of un-scanned candidate symbols; and
  a threshold updating unit, wherein if the cumulative partial Euclidean distance is less than the threshold, the threshold updating unit updates the threshold by the cumulative partial Euclidean distance, and when all of the candidate symbols have been calculated, the controlling unit outputs an estimated symbol combination, and terminates scan of the symbol search tree.

16. The receiving antenna system according to claim 15, wherein the decoding circuit further comprising:
an estimating unit, configured to estimate an estimation symbol according to a receiving signal, wherein the sorting unit sorts the candidate symbols according to a plurality of geometric distances between the candidate symbols and an estimation symbol.

17. The receiving antenna system according to claim 16, wherein the candidate symbols are sorted according to the geometric distances from low to high.

18. The receiving antenna system according to claim 15, wherein the candidate symbols are defined via an Amplitude and Phase-Shift Keying modulation (APSK modulation).

19. The receiving antenna system according to claim 15, wherein the candidate symbols are defined via a Quadrature Amplitude Modulation (QAM).

20. The receiving antenna system according to claim 15, wherein the controlling unit searches the candidate symbols via a Depth-First-Search (DFS) algorithm.

21. The receiving antenna system according to claim 15, wherein a leftmost path of the symbol search tree forms an initial solution.

* * * * *